United States Patent [19]

Salembier et al.

[11] Patent Number: 4,879,729
[45] Date of Patent: Nov. 7, 1989

[54] APPARATUS FOR THE DECODING CODED FREQUENCY MODULATED SIGNALS

[75] Inventors: Philippe Salembier, Paris; Moustanir Lamnabhi, Limeil-Brevannes, both of France

[73] Assignee: U.S. Philips Corporation, New York, N.Y.

[21] Appl. No.: 223,459

[22] Filed: Jul. 21, 1988

[30] Foreign Application Priority Data

Jul. 24, 1987 [FR] France ................. 87 10580

[51] Int. Cl.$^4$ ........................ H04B 1/10
[52] U.S. Cl. ................. 375/104; 455/222; 455/223
[58] Field of Search ............ 375/94, 82, 103, 104; 455/296, 222, 223, 224, 302, 307, 312; 329/136

[56] References Cited

U.S. PATENT DOCUMENTS

| | | | |
|---|---|---|---|
| 3,353,102 | 11/1967 | Meyers et al. | 455/222 |
| 3,588,705 | 6/1971 | Paine et al. | 455/223 |
| 3,979,679 | 9/1976 | Bush et al. | 455/222 |
| 4,272,846 | 6/1981 | Muratani et al. | 455/296 |
| 4,648,126 | 3/1987 | Toffolo | 455/222 |

Primary Examiner—Robert L. Griffin
Assistant Examiner—Marianne Huseman
Attorney, Agent, or Firm—Algy Tamoshunas; Marianne R. Rich

[57] ABSTRACT

A circuit for decoding coded frequency modulated signals eliminates perturbing effects of noise pulse signals by coupling the signal to be detected through a filter having a transfer function that is related to the conjugated transfer function of the frequency modulation deemphasis filter, the spectrum of the noise pulse, the spectral power density of the signal to be demodulated, and the spectral power density of the noise. A comparison circuit provides the signal at the output of the filter when the output signal exceeds a threshold level. A decision circuit, which provides signals representative of the temporal position and polarity of the noise pulses to the correction circuit, is coupled between the comparison circuit and a circuit for generating noise correction pulses. The noise correction pulses are coupled to the decoder with the output signal of the detector to eliminate the effects of the noise pulse.

8 Claims, 4 Drawing Sheets

APPARATUS FOR THE DECODING CODED FREQUENCY MODULATED SIGNALS

BACKGROUND OF THE INVENTION

The invention relates to a circuit arrangement for decoding digitally coded frequency-modulated signals, and more particularly to a circuit for detecting and eliminating noise induced pulse signals at the output stage of the frequency demodulator.

During FM transmission analysis of the signal after demodulation reveals the existence of an operating threshold. Defined in terms of carrier-to-noise ratio, this threshold is generally about C/N=10 dB. If this ratio is higher than the above-mentioned limit, the perturbation affecting the output signal of the frequency demodulator is only constituted by a continuous noise whose spectral power density is substantially proportional to the square value of the frequency if the possible de-emphasis function is ignored.

If, on the other hand, this threshold is not reached, the original restored signal is not only perturbed by the continuous noise but also by noise of a pulsatory type. This type of perturbation constituted by signals referred to as clicks is characterized by the appearance of very short pulses having a large energy, an arbitrary amplitude and an equally arbitrary temporal position. The frequency at which these pulses occur is larger as the said C/N ratio is smaller.

Referring to FIGS. 1a and 1b the presence of these clicks can be approximately interpreted as follows. Assuming that the modulating signal is zero, the carrier A is fixed and the noise vector b(t) turns arbitrarily around the extremity of the carrier, as is shown in FIG. 1a. In reality the frequency demodulator supplies at its output a signal which is proportional to the derivative of the angle $\phi(t)$ if the de-emphasis is not taken into account. Thus, if the carrier-to-noise ratio at the input of the receiver is large, as in the case of FIG. 1a, the noise amplitude is small with respect to that of the carrier and the angle $\phi(t)$ fluctuates around an average value of zero. The output signal $d\phi(t)/dt$ of the demodulator thus has small variations around the value 0.

However, if the noise increases, the amplitude of the noise vector may be as large or even larger than that of the carrier at certain moments. In this situation, shown in FIG. 1b, the resultant vector $\overline{R})/ =\overline{A}+\overline{b})/$ may turn around the origin. Under these circumstances the angle $\phi(t)$ varies abruptly by $\pm 2\pi$ and the output signal which is proportional to $d\phi/dt$ is constituted by a short pulse having a very large amplitude and referred to as click as mentioned above. This type of noise deviates considerably from the white noise model.

If the transmission signals are digitally coded, it is of course necessary to use a digital decoder after the frequency demodulator at the receiving end. If the clicks appear in an arbitrary manner, they may pass the signal from the level at which it is present to another coding level and thereby introduce errors during decoding. The smaller the carrier/noise ratio, the more numerous the clicks and the more frequently these decoding errors occur.

It is thus undeniable that the conventional decoders such as, for example, threshold decoders or the more recent maximum likelihood decoders are better adapted to operate in an environment in which the noise is white, additive and Gaussian than in the case of FM transmission, particularly at a low carrier level. Experiments carried out in the case of satellite transmission of a television signal confirm this fact. The sound part in such a signal is digitally and duo-binary coded and the satellite transmission uses frequency modulation. A detailed analysis of the errors made by the one or the other type of decoder in this field of application confirms that these two decoders almost systematically produce a decoding error when a click occurs, resulting in a degradation of performance of these decoders during FM transmission.

It is an object of the invention to provide a technical solution yielding a better performance during frequency modulation transmission.

SUMMARY OF THE INVENTION

The invention relates to a circuit arrangement as described in the opening paragraph and is characterized in that the detection circuit comprises a linear filter whose transfer function is of the type $$H(f) = \frac{DESAC^*(f) \cdot CLIC(f)}{DESP(num) + DESP(BC)}$$

in which expression f is the frequency, DESAC*(f) is the conjugated transfer function of the de-emphasis filter related to the frequency modulation, CLIC(f) is the spectrum of a click, DESP(num) is the spectral power density of the signal and DESP(BC) is the spectral power density of the continuous noise, in that the comparison circuit is provided for transmitting a zero signal or the output signal of the detection circuit dependent on the level of this output signal with respect to a reference threshold, in that a decision circuit is arranged between the comparison circuit and the pulse-generating circuit for determining two components of information about the temporal position and the polarity of each click transmitted to said correction circuit.

The above-described errors in a transmission circuit using frequency demodulation are effectively corrected by means of the structure proposed. This correction eliminates the effects of each click after its position and its sign (or polarity) have been determined. These perturbation signals can either be subtracted from the perturbed signal (in the case of a positive polarity) or added to the perturbed signal (in the case of a negative polarity). It should be noted that this determination of position and polarity presents some difficulties. On the one hand, it can be observed that in reality a single click sometimes corresponds to several detections at very short time intervals introducing an extra uncertainty as regards the real position of the perturbation signals. On the other hand if the transmitted signals are digitally coded the correction of the digital symbols depends on the temporal position with respect to the click and these symbols. This means provided in the circuit arrangement according to the invention to be described in greater detail, are found to be effective for adapting the currently used decoders to the special conditions of frequency modulation transmission if realized under conditions of modest or poor noise or with a relatively slightly higher carrier level. The proposed solution is inter alia based on the consideration to search for those components in the overall signal which are to be treated and to provide the appropriate detection means which in this case are linear filters preferably associated with a time window bounding a temporal zone for validating the correction information components after detection.

U.S. Pat. No. 4,272,846 describes a circuit arrangement of the same type in the sense that it is suitable for correcting the perturbing effects of pulse signals by adding a signal which is equal to the perturbation signal but which has a phase opposite to that of the signal to be corrected. However, in the case of the invention it has been found that due to the nature of the perturbation signals an uncertainty with respect to their position occurs and according to the invention the operations of generating the correction signal and of correcting are preceded by a decision operation which removes this uncertainty. Thus it appears on the one hand that the problem solved in the case of the invention is more complex than that mentioned in the above-mentioned Patent and that on the other hand this problem is solved in a novel manner, whilst the means defined in the case of the invention are not described in the said Patent.

The invention will now be described in greater detail, by way of example, with reference to the accompanying drawings in which

DESCRIPTION OF THE PREFERRED EMBODIMENTS

Figures 1A, 1B:
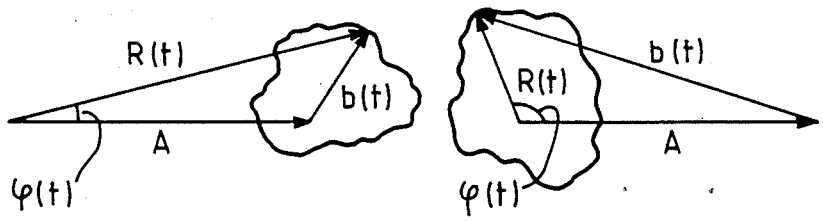
FIGS. 1a and 1b show in a simplified manner the vectorial composition of the carrier and of the perturbation noise which may affect an FM transmission, FIG. 1a corresponding to the case in which the noise amplitude is relatively small and FIG. 1b corresponding to the case in which the said amplitude is at least of the same order as that of the useful signal.
Figure 2:
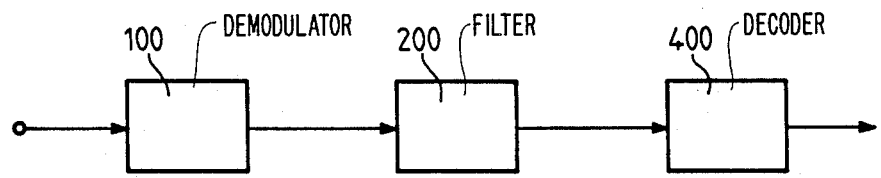
FIGS. 2 and 3 show diagrammatically the structure of the receiving end of a conventional system for transmitting a digitally coded frequency-modulated signal and the structure of such a receiving end provided with the decoding arrangement according to the invention, respectively.
Figure 3:
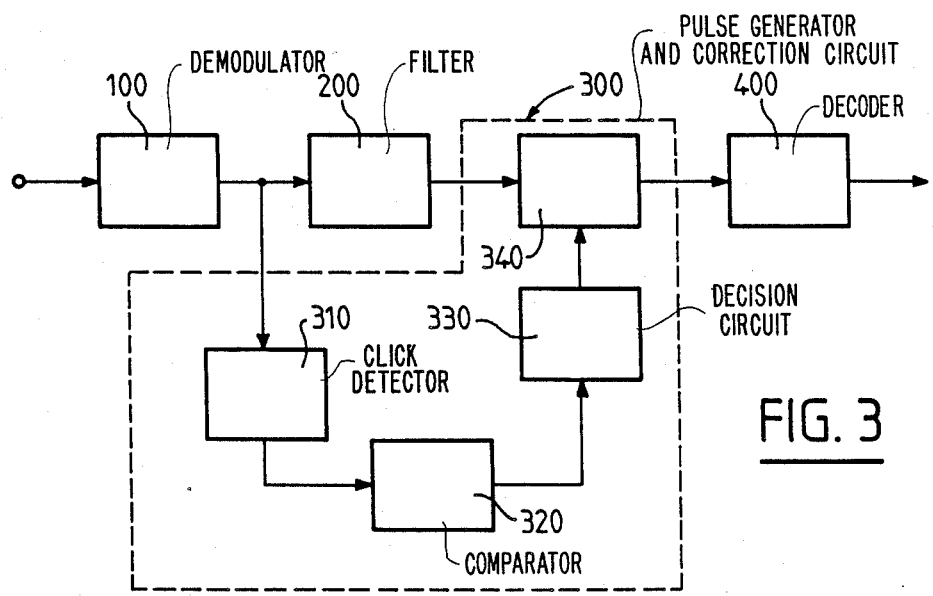

A digital frequency-modulated signal is received in the traditional manner in accordance with the process shown in FIG. 2. The signal received is subjected to a frequency demodulation, and then to a filtering and digital decoding operation. The arrangement for improving the decoding operation, shown in FIG. 3 in a particular embodiment of the invention comprises, as in the case of FIG. 2, a frequency demodulator 100, a filter 200 and a digital decoder 400. According to the invention it comprises inter alia an assembly of circuits denoted by the reference numeral 300 which will hereinafter be described in greater detail.

This assembly 300 is arranged in parallel with the filter 200 and it receives at its input the output signal of the demodulator 100 and its output signal is applied to the decoder 400. More specifically, the assembly 300 comprises a circuit 310 for detecting clicks, a comparison circuit 320, a decision circuit 330, a circuit for generating pulses and a correction circuit.

The circuit 310 for detecting clicks is a filter in this case. Below the demodulation threshold the output signal of the demodulator 100 is constituted by three signals, namely the demodulated signal, continuous noise, and clicks. If this third type of signal is to be detected, it is assumed that these clicks form the useful signal and that the digital signal and the continuous noise are the perturbation signals interfering with the detection of these clicks. The linear theory of optimum detection of a signal (in this case a click) in a noise signal (in this case the digital signal and the continuous noise) shows that in accordance with an optimization criterion chosen in this case as being a search for the maximum power ratio of the useful signal and the noise at the instant of decision, the better detector comprises a linear filter whose transfer function H(f) may be expressed in the following way:

$$H(f) = \frac{DESAC^*(f) \cdot CLIC(f)}{DESP(num) + DESP(BC)}$$

in which expression DESAC*(f) is the conjugated transfer function of the de-emphasis filter provided for the frequency modulation, CLIC(f) is the spectrum of a click (which depends on the mode of representation of the click, for example a Dirac function, or a narrow Gaussian function), DESP(num) is the spectral power density of the digital signal, BC is the continuous noise, DESP(BC) is the spectral power density of the continuous noise and f is the frequency.

In the hypothesis that each click is formed by a Dirac function and in which the transmitted signal is digital and duo-binary coded, the filter with which these clicks are detected in the case of receiving television signals has the following transfer function ($\alpha$ being a factor dependent inter alia on the carrier noise ratio C/N, and I being the characteristic function which is equal to 1 from 0 to TM T i.e. from 0 to approximately 5 MHz, and equal to zero beyond this frequency):

$$H(f) = \frac{DESAC(f)}{I \cdot \cos^2(\pi fT) + \alpha \cdot |DESAC(f)|^2 \cdot f^2}$$

In this case the spectral power density of the transmitted signal is proportional to the $\cos^2(\pi fT)$ in which T is the inverse value of the rate of symbols which is equal to 10.125 MHz in this case. The deemphasis function for the situation considered is $$DESAC(f) = \sqrt{2} \cdot (1 + jf/f_1)/(1 + jf/f_2)$$

in which $f_1 = 1.5$ MHz and $f_2 = 0.84$ MHz. The realization described could be analog or digital. In the digital example described in this case, the sampling frequency $f_e$ is chosen to be equal to 40.5 MHz, i.e. to 4 times the frequency of the duo-binary symbols. This choice has as a consequence that it is possible to distinguish a click either falling on a duo-binary symbol or between two successive symbols, or in one of the two intermediate positions at ¼ or ¾ of the period between two symbols.

This filter for detecting clicks is simply realized approximately by means of a filter having 13 active coefficients all of which have a power of 2 if multiplications are to be avoided. In fact these can be realized at 40.5 MHz but they are costly and are advantageously replaced by shifting the appropriate number of bits. If $X_{k\pm i}$ are the successive samples which are representative of the digital transmitted signal, the output signal of this filter having 13 coefficients is given by $$Y_k = a_0 X_k + a_1 (X_{k+1} + X_{k-1}) +$$
$$a_2(X_{k+2} + X_{k-2}) + a_3(X_{k+3} + X_{k-3}) +$$
$$a_4(X_{k+4} + X_{k-4}) + a_6(X_{k+6} + X_{k-6}) +$$
$$a_7(X_{k+7} + X_{k-7})$$

with the following Table of coefficients $a_0=16$, $a_1=a_{-1}=4$, $a_2=a_{-2}=a_3=a_{-3}=a_4=a_{-4}=-4$, $a_5=a_{-5}=0$, $a_6=a_{-6}=1$, and $a_7=a_{-7}=2$.

Figure 4:
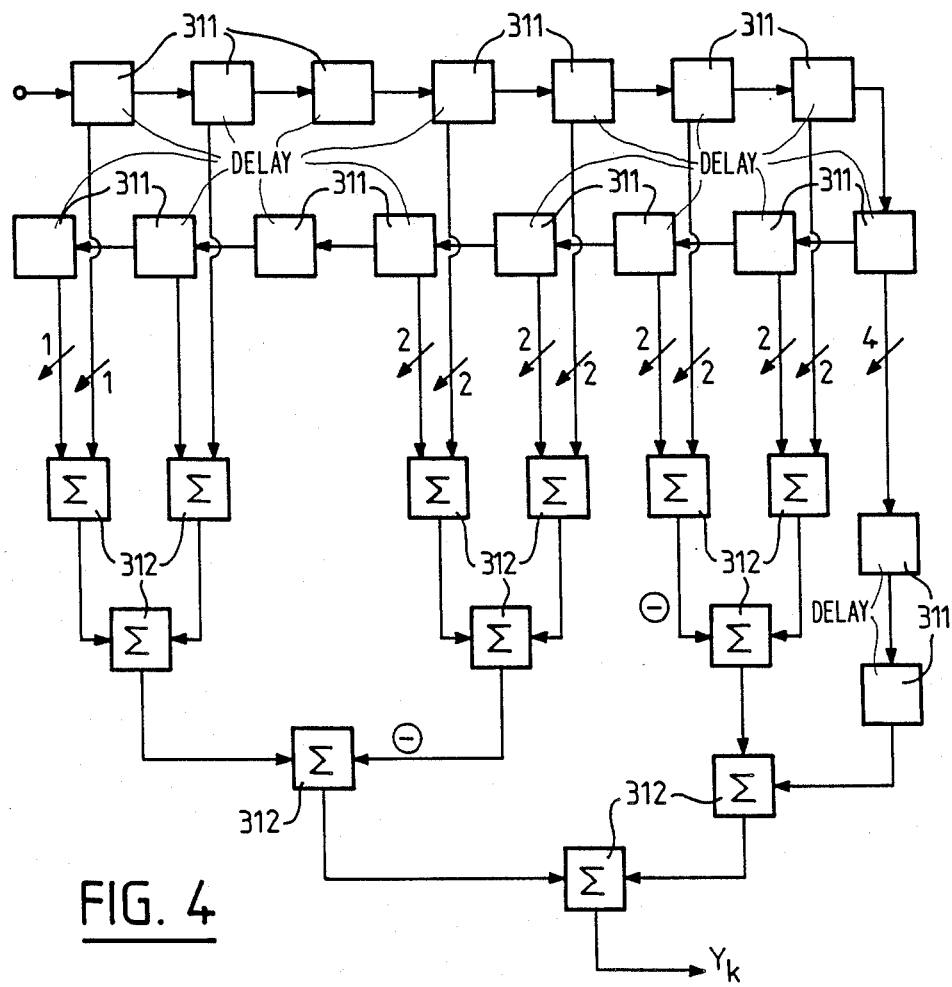
FIG. 4 shows an embodiment of the detection circuit of the decoding arrangement of FIG. 3.

A possible realization of this filter is shown in FIG. 4 which comprises seventeen delay circuits 311 and twelve summing devices 312 whose inputs are positive or negative (only the negative inputs are shown according to the signs affecting the coefficients of the expression of $Y_k$). All multiplications in this expression of $Y_k$ are realized by shifting 4 bits for $a_0$, 2 bits for $a_1$ to $a_4$, and 1 bit for $a_7$. These shifts are shown diagrammatically in FIG. 4 by means of an arrow at which the number of shifted bits is shown.

The output signal of the circuit 310 for detecting clicks is supplied to the comparison circuit 320 in which the absolute value of the output signal of the circuit 310 is compared with a threshold. If the value thus presented is lower than the threshold, the output signal is rendered 0. If on the other hand the value is higher than the threshold, the output signal is transferred as such at the output of the comparison circuit 320. The value of the threshold is generally dependent on the carrier noise ratio C/N used.

Figure 5:
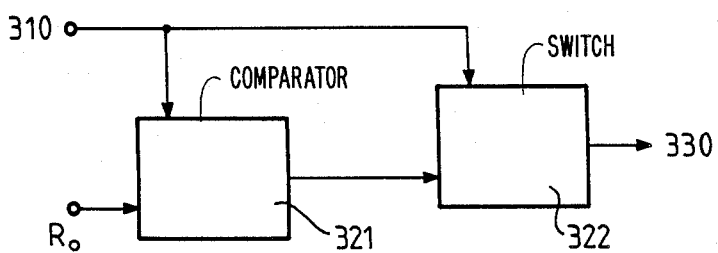
FIG. 5 shows an embodiment of the comparison circuit of the said detection circuit.

A possible realization of the comparison circuit 320 is shown in FIG. 5 in which a comparator 321 receives the value of the reference threshold $R_0$ and the output signal of the click detection circuit 310 and it supplies a binary signal which is applied to a first input of a switching circuit 322 constituted by an assembly of logic AND-gates. This circuit 322 receives at a second input the output signal of the click detection circuit 310 and supplies an output signal which is either equal to 0, if the threshold is not exceeded, or which is equal to the output signal of the click detection circuit 310 if this output signal is higher than the said threshold.

The output signal of the comparison circuit is thus constituted by a series of values which are almost all zero except for those which exceed the threshold and which correspond to a click. Unfortunately, for a single click which is thus detected several detections which are at very close intervals may be produced, one of which being located at the same temporal position as the click associated with this group of detections. For exactly determining this temporal positions those detections having the absolute maximum value should be known.

Figure 6A:
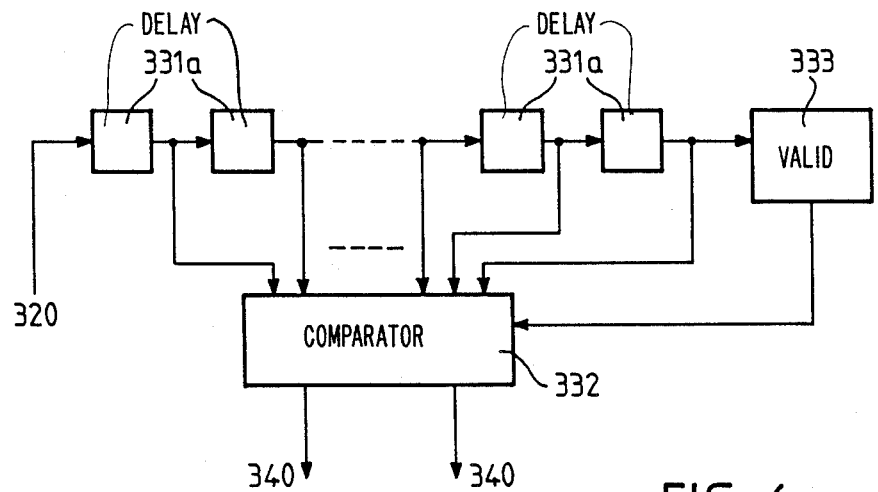
FIGS. 6a and 6b show two embodiments of the decision circuit of the decoding arrangement according to the invention.

The decision circuit 330 shown in FIG. 6a realizes this operation. Whenever a non-zero value is detected at the output of the comparison circuit 320, a time window of the width L is opened (this width is limited without significantly restricting the performance in the case of the above-mentioned close interval realization to that including the central lobe and the two secondary lobes of the pulse response of the filter), subsequently the largest value is localized within this window (if several values are detected). The real temporal position of the click corresponds to this largest value, which position is memorized simultaneously with the sign of the click. FIG. 6a shows a series of delay circuits 331a defining the length L and having their outputs connected to inputs of a comparator 332a. A validation circuit 333a controlled by the first non-zero value which has triggered the opening of the time window L activates the comparator 332a which selects the two information components of temporal position and polarity of the click having the largest amplitude and being detected within this window.

Figure 6B:
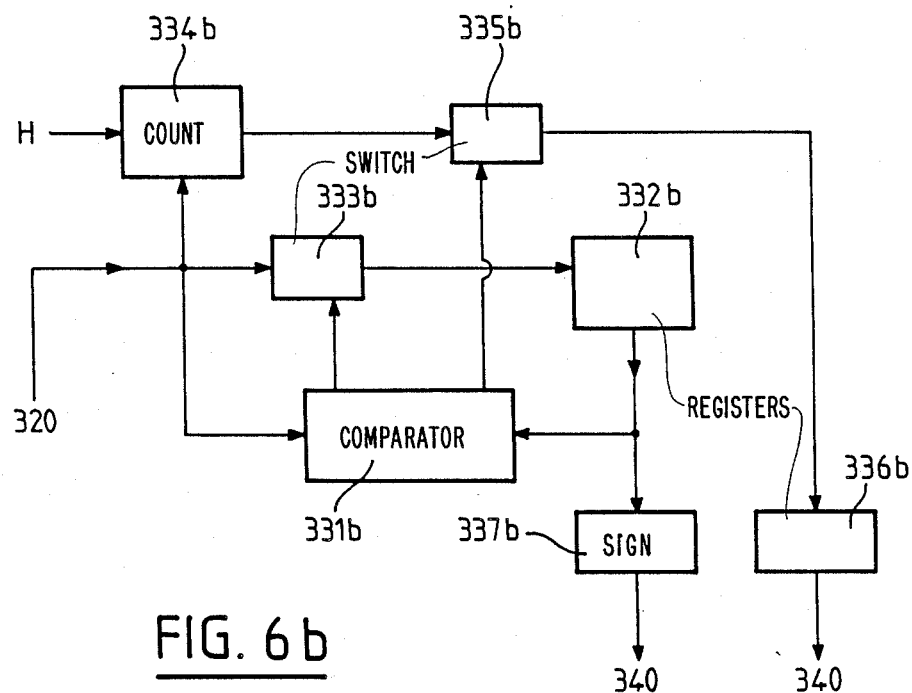

FIG. 6b shows another embodiment of the decision circuit 330. In this modification a comparator 331b receives at a first input the output signal of the comparison circuit 320 and at a second input the output signal of a first register 332b storing the maximum value of the non-zero values of the output of the comparison circuit 320. The output of the comparator 331b controls the opening or closure of a first switch 333b which, dependent on its position, connects or disconnects the said output of the comparison circuit 320 to the input of the register 332b. Marking of the position having the largest value detected within the time window is ensured, as soon as this window is opened, by means of a counter 334b receiving the output signals from the comparison circuit 320 for opening the time window and receiving the sampling rate (connection H). The output of the comparator 331b also controls the opening or closure of a second switch 335b which, dependent on its position, connects or disconnects the output of the counter 334b to the input of a second register 336b storing the position associated with the maximum value stored in the first register 332b. The signal of the stored maximum value can be recognized by means of a circuit 337b for determining the sign, arranged at the output of the first register 332b. In this modification the two components providing information about the temporal position and the polarity of the detected click are thus available at the output of the second register 336b and of the circuit 337b for determining the sign, respectively.

The circuit 340 which in the Figures combines the function of generating the pulses and correction, receives the output signal of the decision circuit 330, i.e. the two components of information about the temporal position and polarity, and is intended to correct the effect of the presence of clicks in the signal to be decoded, dependent on these information components. Here again various modes of realization are possible.

Figure 7A:
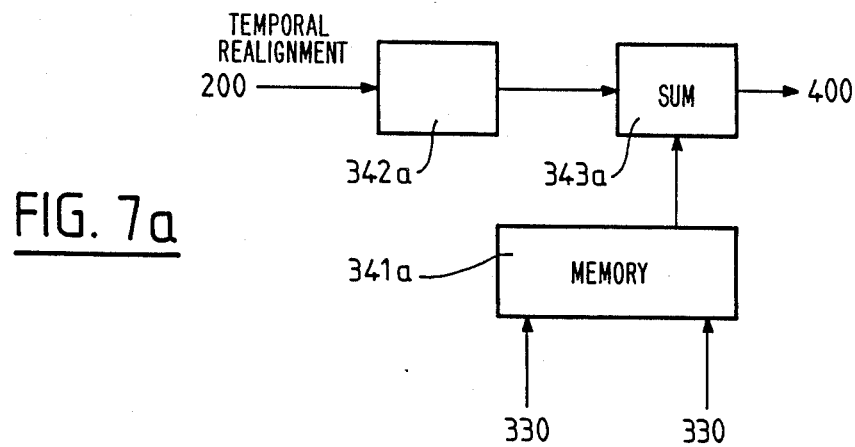
FIGS. 7a to 7c show three embodiments of the correction circuit of the decoding arrangement.

In the first mode of realization shown in FIG. 7a the value of the click being superposed on the input signal of the digital decoder 400 is directly subtracted from this input signal (or this value is added in the case of negative polarity). The circuit for generating pulses includes a memory 341a comprising the value or values to be subtracted (or to be added in the case of negative polarity). The correction circuit comprises a summing device 343a receiving via a temporal realignment circuit 342a the output signal from the filter 200 (or from the frequency demodulator if this filter were incorporated in the demodulator instead of constituting a separate circuit) and it receives the output signal of the circuit for generating pulses constituted by the memory 341a. The formation of a click by means of a Dirac function, though being a good tool for detecting such a click, is found to be insufficient for judging the influence of this click on the transmitted symbols. Because of its temporal spread this click may affect one or several transmitted symbols as a function of its instant of arrival. Dependent on the position of the click with respect to the position of the transmitted symbols it is thus sufficient to have one value stored in the memory 341a for performing the ultimate correction or to extract several values from the memory 341a. For example, if the temporal position of the click coincides with that of a digital sample, only this sample will be affected by the click: thus it is the only one to be submitted to the ultimate correction (which is a subtraction if the polarity of the click is positive and which is an addition if this polarity is negative). If on the other hand there is no temporal coincidence between the click and a sample, at least two samples will be affected by the perturbing click and they must be ultimately corrected by means of several values extracted from the memory 341a.

Figure 7B:
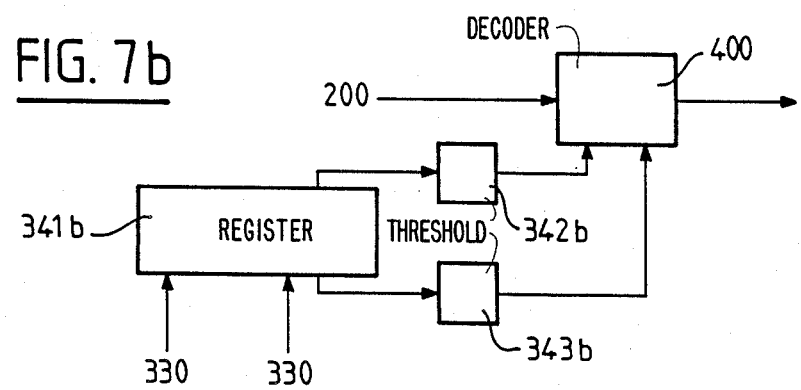
Figure 7C:
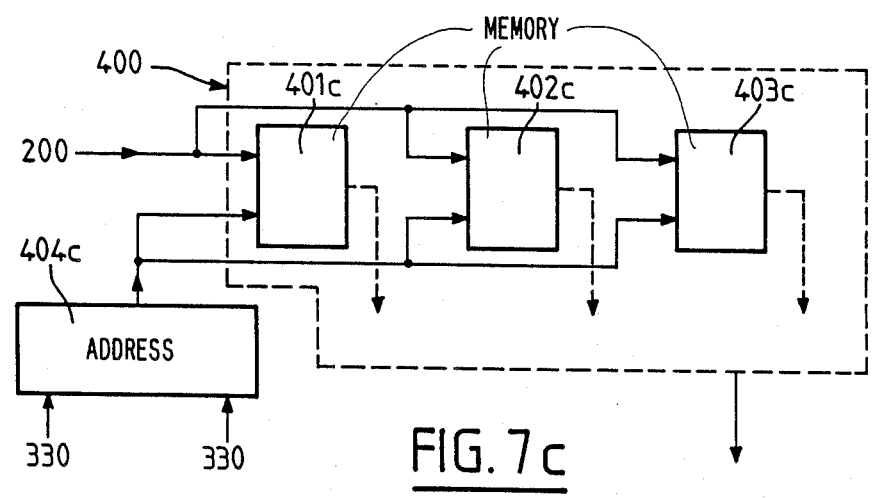

In the second and third modes of realization shown in FIGS. 7b and 7c, respectively, the effects of the clicks are eliminated by modifying one element or elements within the decoder 400 instead of performing an external correction on the decoder before this decoder.

For example, in the case of a threshold decoder the effects of the clicks are eliminated by modifying the threshold(s) at the moment when a click occurs. This operation is illustrated in FIG. 7b which in the case of a decoder having two thresholds shows a storing register 341b receiving the two information components about temporal position and polarity of the clicks from the decision circuit 330. The output signals of this register 341b are applied to two threshold control circuits 342b and 343b whose output signals are the thresholds to be applied to the decoder 400 receiving in the embodiment shown a series of duo-binary signals and restoring a sequence of binary signals.

In the case of a Viterbi decoder three read-only memories of the PROM type could be arranged at the head of this decoder for parallel receiving the duo-binary signals which succeed one another in series at the output of the receiving channel. These three memories thus comprise probabilities P(y/0), probabilities P(y/1), and probabilities P(y/2) representing the probabilities of effectively having received a signal y signifying whether the duo-binary sample x which is actually supplied would be 0, 1 or 2, respectively. These probabilities are utilized (such as they are or in a logarithmic form which simplifies the circuits because multipliers can be replaced by adders) for determining and reconstructing two binary paths having the largest probability of accordance with the Viterbi algorithm, whilst the comparison of the probabilities thus estimated leads after an ultimate decision to the selection of that path thus reconstructed which presents the maximum probability and which thus leads to the best estimated sequence of duo-binary samples supplied in accordance with the sequence of received duo-binary signals.

As these three memories are addressed by the signals which they receive for supplying the said corresponding conditional probabilities, it is proposed to annihilate the effects of the clicks by modifying the distribution of these elementary probabilities at the instant when a click occurs. For this purpose it is sufficient to modify the addresses in the three memories of the decoder in accordance with a diagram as is shown in FIG. 7c in which the memories for storing the conditional probabilities P(y/0), P(y/1), P(y/2) (or for storing their algorithm in accordance with the envisaged mode of realization) are denoted by the reference numerals 401c, 402c, 403c, respectively. The inputs of these three memories 401c to 403c receive for their addressing the series of successive digital samples and the output signal from a circuit 404c for modifying the addresses whose input signals are constituted by two components of information about the position of the click and the polarity, supplied by the decision circuit 330. The presence of this circuit 404c provides the possibility of suitably modifying the probability addresses within these memories and thus realizes against the equivalent of the desired functions of generating pulses and of correction.

What is claimed is:

1. A circuit for decoding coded frequency-modulated signals having a frequency demodulator, a detector coupled to the frequency demodulator and including detection and comparison circuits for detecting noise pulse signals, a pulse-generating circuit coupled to the detector, and a correction circuit coupled to the pulse generating circuit for eliminating perturbing effects of noise pulse signals wherein the detector comprises a linear filter having a transfer function of the type $$H(f) = \frac{DESAC^*(f) \cdot CLIC(f)}{DESP(num) + DESP(BC)}$$

where f is frequency, DESAC*(f) is a conjugated transfer function of a de-emphasis filter provided for the frequency modulation, CLIC(f) is a spectrum forming a noise pulse signal, DESP(num) is a spectral power density of a signal, and DESP(BC) is a spectral power density of continuous noise, and wherein the comparison circuit provides a zero signal or an output signal of the detector dependent on the output signal level with respect to a reference threshold, and further comprises
  decision means coupled between the comparison circuit and the pulse-generating circuit for determining temporal position and polarity, of each noise pulse signal transmitted to the correction circuit.

2. A circuit in accordance with claim 1, wherein the frequency modulated signals are coded television signals and further including a decoder and a filter coupled between the frequency demodulator and the decoder and wherein the decision means comprises means for opening a temporal window and for validating a signal having a maximum amplitude within the temporal window.

3. A circuit in accordance with claim 2, wherein a non-zero value signal provided by the comparison circuit opens the temporal window and wherein the decision means comprises
  a plurality of delay circuits arranged to successively receive output signals from the comparison circuit so that added delays define a length of the temporal window,
  comparator means for coupled to the delay circuits for providing temporal position and polarity of that noise pulse of greatest amplitude detected within the window, and
  validation means responsive to a first non-zero value signal from the comparison circuit for providing temporal position and polarity of the noise pulse signal of greatest amplitude.

4. A circuit in accordance with claim 2 wherein the decision means comprises
  a first storing register, a first switch coupled between the first storing register and the comparison circuit,
  a comparator coupled to receive the output signal from the comparison circuit and a signal stored in the first storing register and further coupled to the first switch to provide signals that open and close the switch in accordance with a comparison of the signal stored in the first storing register and the output signal of the comparison circuit so that maximum value output signals from the comparison circuit are stored in the first storing register, a counter responsive to the output signals of the comparison circuit and pulses at a predetermined frequency to provide a count representative of temporal positions of the maximum value signals, a second storing register for storing temporal positions associated with the maximum value signals, a second switch coupled between the counter and the second storing register and responsive to signals coupled from the comparator to open and close in accordance with the comparison of the signal stored in the first storing register and the output signal of the comparison circuit, whereby polarity and temporal positions of maximum value signals are stored in the second storing register.

5. A circuit in accordance with claims 3 or 4, wherein the correction circuit comprises a memory coupled to receive maximum value signals from the decision circuit for storage therein, and a summing device coupled to the memory and the linear filter such that maximum value signals stored in the memory are added to signals from the linear filter, thereby eliminating perturbing effects of noise pulse signals.

6. A circuit in accordance with claims 3 or 4, further including a decoder coupled to receive signals from the linear filter.

7. A circuit in accordance with claim 6, wherein the decoder is responsive to at least one threshold signal, and wherein the correction circuit comprises a register coupled to the decision means and the decoder for storing temporal position and polarity of maximum value signals that control the thresholds of the decoder.

8. A circuit in accordance with claim 6, wherein the decoder is constructed and arranged to have three memories each addressed by the output signal of the detector to provide signals stored at addressed locations and further comprises an address modifying circuit coupled to receive the temporal position and polarity signals from the decision circuit and the three memories which provide address modifying signals in response to the temporal position and polarity signals.

* * * * *